United States Patent [19]
Sturgeon et al.

[11] Patent Number: 5,926,175
[45] Date of Patent: Jul. 20, 1999

[54] METHOD AND APPARATUS TO PREVENT TOP-MOST WINDOWS FROM INTERFERING WITH TV MODE IN A PC/TV

[75] Inventors: Derrill L. Sturgeon, Houston; Mark P. Vaughan, Spring, both of Tex.

[73] Assignee: Compaq Computer Corporation, Houston, Tex.

[21] Appl. No.: 08/941,160

[22] Filed: Sep. 30, 1997

[51] Int. Cl.⁶ ..................... H04N 7/00
[52] U.S. Cl. .............. 345/327; 345/342; 348/552
[58] Field of Search .................. 345/340, 341, 345/344, 326, 327, 353; 348/553, 563, 564, 44, 565, 552

[56] References Cited

U.S. PATENT DOCUMENTS

| | | | |
|---|---|---|---|
| 4,628,541 | 12/1986 | Beavers . | |
| 4,775,928 | 10/1988 | Kendall et al. . | |
| 5,192,999 | 3/1993 | Graczyk et al. | 358/85 |
| 5,276,679 | 1/1994 | McCay et al. | 370/84 |
| 5,459,832 | 10/1995 | Wolf et al. | 345/342 |
| 5,530,865 | 6/1996 | Owens et al. | 395/700 |
| 5,537,152 | 7/1996 | Ishikawa | 348/564 |
| 5,543,824 | 8/1996 | Priem et al. . | |
| 5,668,962 | 9/1997 | Kitami | 345/340 |
| 5,675,390 | 10/1997 | Schindler et al. | 348/552 |
| 5,699,535 | 12/1997 | Amro | 345/342 |
| 5,760,772 | 6/1998 | Austin | 345/342 |
| 5,825,356 | 10/1998 | Habib et al. | 345/344 |
| 5,872,567 | 2/1999 | Amro | 345/342 |

OTHER PUBLICATIONS

"Gateway 2000 Sells Destination Big Screen PC Through Retail Chains"; Internet article http://www.gw2k.com/CORPINFO/press/1996/destret2.htm; (Aug. 21, 1996); pp. 1–4.

"Gateway 2000 Launches Destination Big Screen PC Featuring 31–inch Monitor"; Internet article; http://198.111.255.58:80/./corpinfo/press/1996/destnew4.htm (Aug. 21, 1996); pp. 1–5.

"The Big–Tube PCTV"; *PC Online/ Trends Online;* May 28, 1996; http://www.pcmag.com/news/trends/t960528b.htm (Aug. 21, 1996); pp. 1–3.

"Destination Features"; Internet article; http://198.111.255.58:80/./destination/Info/Feature2.htm (Aug. 21, 1996); pp. 1–5.

"Telefuzion"; Internet article; http://telefuzion.com/2/2s.htm (Mar. 12, 1997); pp. 1–2.

Snider, Mike; "High–Tech; Now you can tune your TV to the Internet"; *USA Today;* Sep. 18, 1996; Internet article; http://www.usatoday.com/life/cyber/tech/ct237.htm (Mar. 12, 1997); pp. 1–2.

*Primary Examiner*—Andrew I. Faile
*Assistant Examiner*—Reuben M. Brown
*Attorney, Agent, or Firm*—Jenkens and Gilchrist

[57] ABSTRACT

An electronic convergence device system, such as a PC/TV adapted to operate in a computer mode and a TV mode. When switching and/or operating in TV mode the top-most windows from the computer mode applications are inhibited from interfering with the TV mode experience.

4 Claims, 5 Drawing Sheets

METHOD AND APPARATUS TO PREVENT TOP-MOST WINDOWS FROM INTERFERING WITH TV MODE IN A PC/TV

BACKGROUND OF THE INVENTION

1. Technical Field of the Invention

The present invention relates to devices with integrated multiple functional modalities which includes a TV mode and a computer mode. In particular, the present invention relates to a system, apparatus, and method of preventing "top-most" windows from being overlaid on a TV picture when a PC/TV is in TV mode.

2. Description of Related Art

Achieving convergence of various information, entertainment and communications technologies has become a much sought-after goal. A highly visible example of this trend is the attempt to integrate computer technologies (such as, for example, personal computer technologies) with consumer/home electronics technologies (such as, for example, television technologies, video game technologies, video telephony, video/laser disc technologies, et cetera). It is hoped that one of the products of this convergence would be a single integrated device for information, entertainment and communications, which device can, at least in part, utilize the available communications bandwidth, mass storage and graphics handling capabilities of the personal computer (PC) to deliver, store and display a variety of applications so as to provide a seamlessly unified audio-visual environment to consumers.

In spite of many recent advances in this area, several problems persist. One of the more significant difficulties relates to providing a user/viewer effective content control and engaging interactivity, preferably all in one machine, with selectable modes of "functionalities" that essentially appertain to experiences associated with different discrete entities, for example, a PC or a TV or a video/laser disc unit et cetera, such that the viewer can seamlessly make a transition from one functionality to another. Further, it can be appreciated that by providing a functionality that is as close as possible to a discrete unit in terms of the viewer's experience thereof, the convergence aspect of the machine is greatly enhanced. Such enhanced convergence may be necessary or desirable in relation to increasing the "appeal" and feature-set of the integrated device.

Current developments in this area fall into two broad categories. One category relates to conventional TV sets with access to the Internet or the World-wide Web. The other category relates to personal computers (PCs) with a limited TV functionality. Neither of these categories provide a "fully-converged" system wherein the viewer can seamlessly select from a broad "menu" of experiences, each of which comprises a functionality that is substantially identical to one offered by an individual discrete unit. Current TV sets with Web access do not offer the full range of PC functionality. On the other hand, current PCs operable with TV signals provide only a limited TV experience in that a TV application is typically displayed as a window on the PC desktop presented on the same monitor associated with the PC. Typically, the viewer does not experience in these systems a TV viewing environment that is identical to a conventional TV with over-scanned display images having enhanced brightness, sharpness, contrast and color temperatures, enhanced Red-Green-Blue (RGB) amplifier gains et cetera.

Furthermore, in a PC conveyed with a TV it is important that when the system is in a TV mode that the screen looks very similar to that of a TV. It is important that the user who does not understand how to operate a computer can operate the system in TV mode. For example, a user should not need to know how to manipulate a window or be concerned as to which window or keyword within a window has "focus".

It is also important that certain pieces of commercial software that create top-most windows on a computer screen are handled properly to stop the top-most windows from being overlaid on the TV picture in TV mode.

Accordingly, based upon the foregoing, it should be understood and appreciated that there is a need for a system that is more completely converged than is currently known or possible in order to provide a user/viewer with a seamless environment for education, entertainment, communications and information. Although systems such as TVs with Web access and PCs with TV in a window described above have been in existence for sometime, no current system is known to have all of the advantages and novel features of the system described and claimed hereinbelow.

SUMMARY OF THE INVENTION

It is an object of the present invention to provide a converged electronic system which includes PC and TV functionality in such a manner that windows in PC mode that have a top-most characteristic are not overlaid on a TV picture when the present invention is in TV mode. The system, ideally, will store a list of the top-most windows that were active prior to the computer system switching to TV mode. The stored list will contain information related to which windows were modified/inhibited from being top-most windows. The list can be revisited when the system is switched from TV mode to PC mode in order to restore the top-most window characteristic in PC mode.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
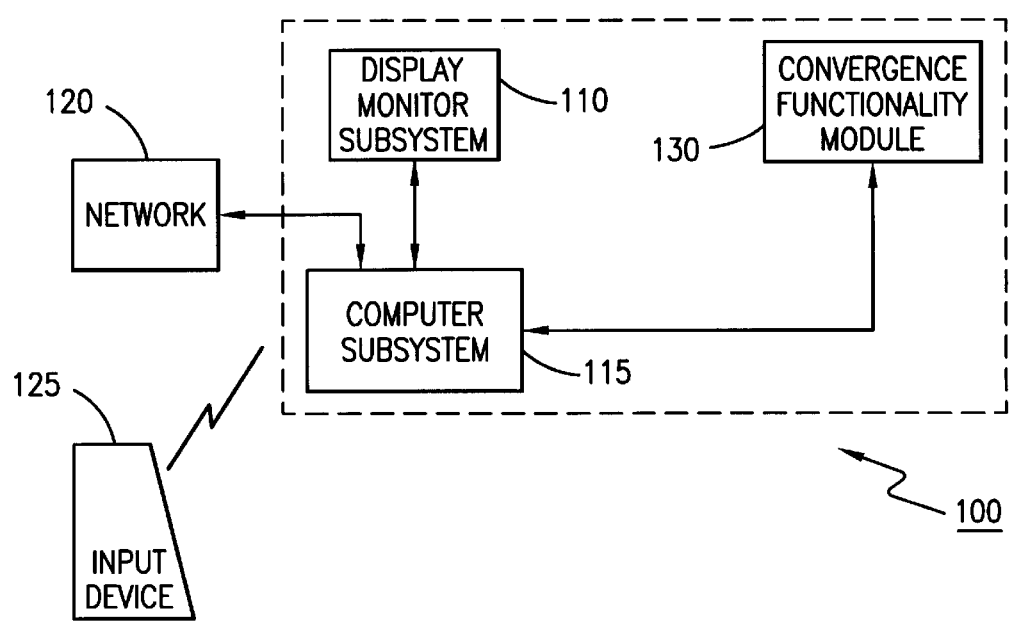
FIG. 1 illustrates an exemplary convergence device system provided in accordance with the teachings of the present invention.

Referring now to the Drawings wherein like or similar elements are designated with identical reference numerals throughout the several views, and wherein the various elements depicted are not necessarily drawn to scale, and, in particular, to FIG. 1, there is shown a block diagram of an exemplary convergence device system (or, an electronic convergence device) 100 provided in accordance with the teachings of the present invention. This block diagram is not necessarily intended to schematically represent specific modules of hardware or any particular data or control paths therebetween.

The convergence device system 100 includes a first subsystem, display monitor subsystem 110, operable to receive and display thereon display signals (or, indications thereof) received from a second subsystem, computer subsystem 115. Although not depicted, the subsystem 115 comprises a processor unit coupled to a storage unit, and may further preferably contain a communication port for enabling communication between the convergence device system 100 and a network 120.

Continuing to refer to FIG. 1, the network 120 can be understood to be any network, for example, a Local Area Network, a Metropolitan Area Network, a Wide Area Network, or the Internet. The computer subsystem 115 is connected to a convergence functionality module 130 that is adapted to receive and/or provide various combinations of composite and/or RF and/or video and/or audio and/or graphics and/or data signals. For example, the module 130 may comprise a receiver for receiving TV signals in any form, such as the National Television Standards Committee (NTSC) form or the Phase Alternate Line (PAL) form, via any medium, digital or analog, such as the cable system, the Digital Satellite System, or a network broadcast medium. In another embodiment, the module 130 may comprise a consumer/home electronics unit adapted to be integrated with the computer subsystem 115. For example, a video gaming unit or a video disc unit may be provided such that the outputs (video, audio, or both) of the units are controlled or modulated by the computer subsystem 115. A video controller service in the subsystem 115 may be responsible for managing these outputs such that appropriately modulated (or decoded or processed) display signals (or, indications thereof) are selected to be forwarded to drive suitable output devices, for example, the display monitor subsystem 110 or an audio output device (not shown).

Although the module 130 and the subsystem 115 are shown to be two separate yet interconnected entities, the module 130 may in some embodiments of the present invention be integrated into the subsystem 115. Such an integrated subsystem may comprise in a single housing one or more video sources (or consumer/home electronics units including receivers for TV signals, gaming units, VCRs, video/laser disc units, video telephony units etc.), the video control service for managing and selecting among these sources and for generating appropriate display signals (or, indications thereof) to be provided to suitable output devices, and the processor and storage units. Still continuing to refer to FIG. 1, the convergence device system 100 may be operable with an input device 125 which may comprise any of the following: remote control units, remote trackball/mouse devices, remote pointing devices, wireless or wired keyboards, keyboards integrated with pointing devices, track-balls and the like. Further, although not shown in this figure, it should also be understood that the convergence device system 100 may contain such hardware modules as a power unit for supplying power thereto, TV tuner boards, CD-ROM players, floppy drives, printer ports, video ports et cetera.

Figure 2:
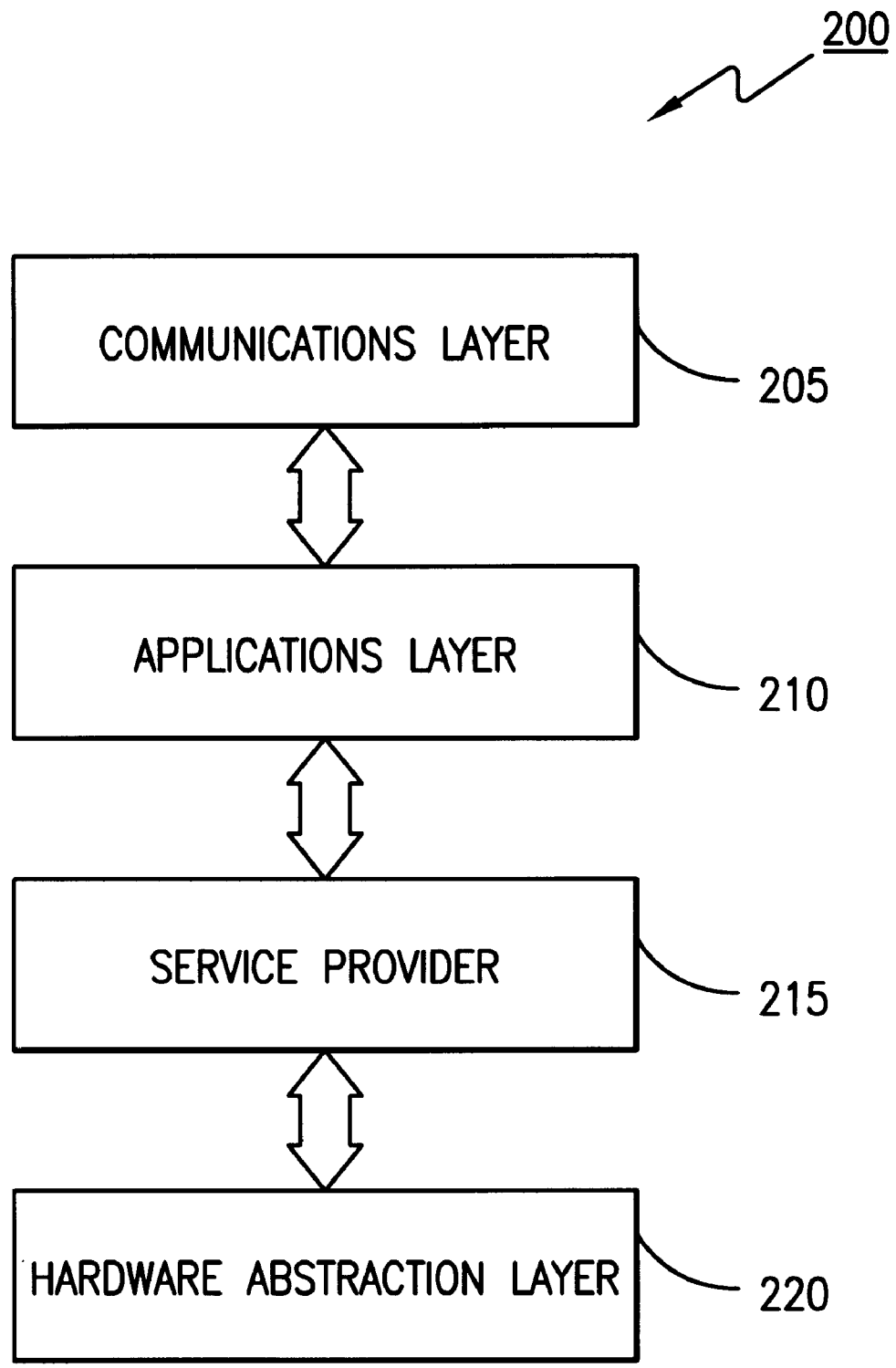
FIG. 2 depicts a block diagram of a high-level architectural scheme for use with an exemplary convergence device system provided in accordance with the teachings of the present invention.

Referring now to FIG. 2, there is shown a block diagram of a high-level architectural scheme 200 for use with the exemplary convergence device system 100. At the lowest level is one or more hardware abstraction layers (HALs) 220 which preferably handle direct hardware interfaces coupled to various hardware entities such as remote devices, keyboards, TV decoders, video decoders, display controllers, audio mixers, compact disc drives et cetera. Preferably, the hardware abstraction layer 220 can completely hide the specifics of implementation of different hardware modules as long as they perform the same function. Immediately above the HAL 220 is a service provider layer 215 which interfaces to the HAL 220 by a defined mechanism. This defined mechanism, in some instances, may be a widely accepted suitable standard that is specific to the type of an application in use. The service provider layer 215 exports an application-specific Application Programming Interface (API) for an applications layer 210 to use. It is presently preferred that the API be a standard interface. It should be understood that as new functions are added, a new standard API may have to be developed for implementing such a new function in the convergence device system of the present invention.

Continuing to refer to FIG. 2, the application layer 210 handles, at least in part, one or more direct user interfaces for the user to control a feature-set that may be provided with the convergence device system 100. A communications layer 205 is provided in the scheme 200 for facilitating information and data exchange between the applications. It can be appreciated by those skilled in the art that the architectural scheme 200 is flexible and extensible so as to support a variety of software and hardware modules, additional services and functionalities necessary for achieving such a degree of convergence as contemplated within the realm of the present invention.

An Operating System (OS), for example, Windows 95®, associated with the convergence device system 100 may preferably be provided with a plurality of selectable items on the base level of its start menu such as, for example, the following: Programs, Documents, Settings, Find, Help, Run, Mode_Select, Setup, Video Entertainment Center (VEC) or Video Center Service Applications and/or Bundled Applications. Access to these items may be facilitated via a START or MENU button that may be preferably located on a remote control unit operable with the system 100.

Figure 3:
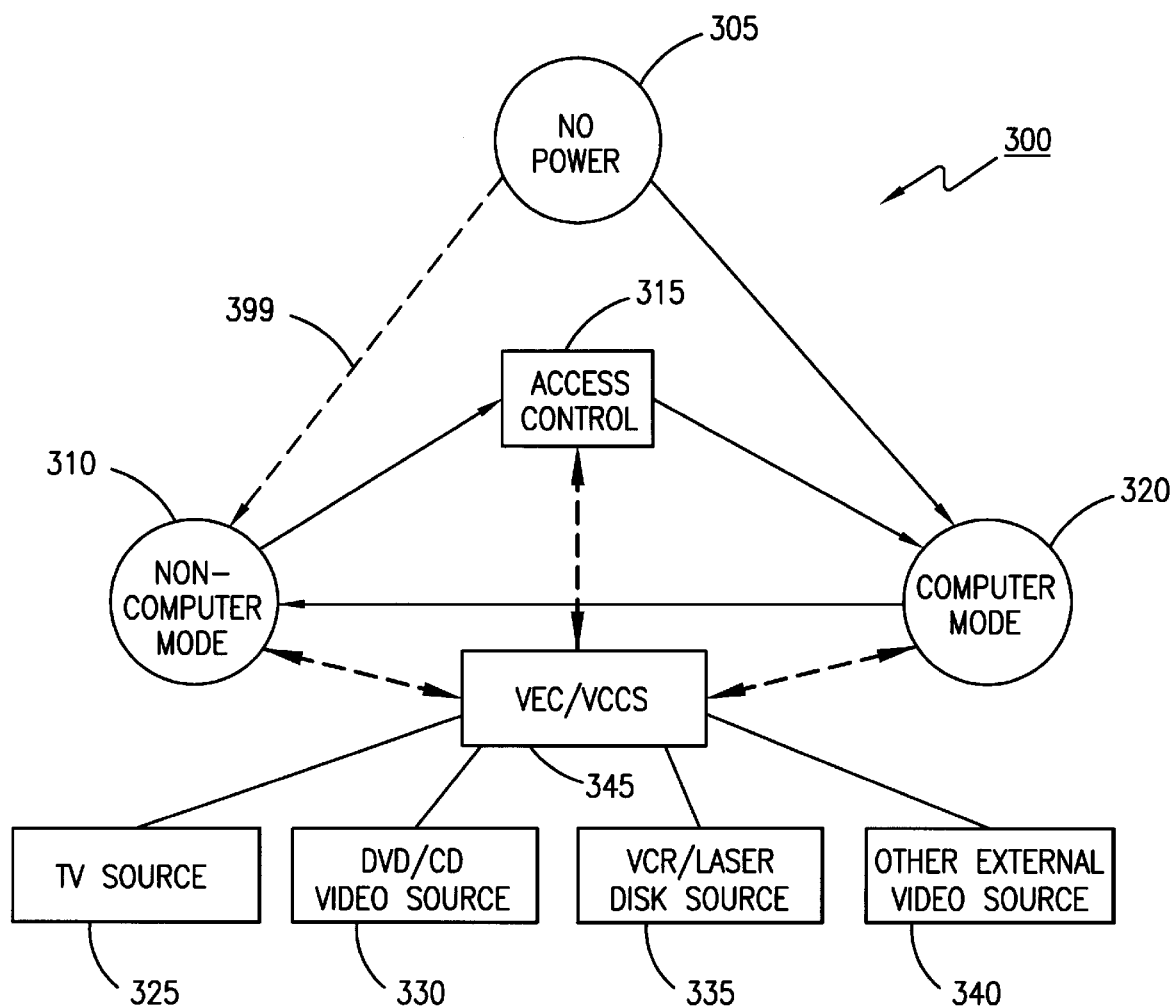
FIG. 3 depicts a state diagram for modal transitions in an exemplary convergence device system provided in accordance with the teachings of the present invention.

The Mode_Select item is provided, at least in part, for facilitating a selection by user for experiencing and/or operating and/or interacting with one of the converged functionalities (or, modalities) presently supported by the system 100. FIG. 3 depicts a state diagram for modal transitions in the exemplary convergence device system 100 provided in accordance with the teachings of the present invention. In a presently preferred exemplary embodiment, a first mode of functionality is referred to as a "computer" mode 320 wherein the system 100 is preferably experienced by the user as a Personal Computer with a complete "look and feel" thereof. In this mode, the display monitor associated with the system 100 preferably possesses the following characteristics: underscan of the display image, disabled velocity scan modulation, a pre-determined "low" value associated with contrast, brightness and color temperature settings et cetera.

In accordance with the teachings of the present invention, a second mode of functionality and/or viewer experience, referred to as a "non-computer" mode 310, is provided for the system 100. It is preferably provided in this mode that the user experience is substantially identical to that of a functionality and look/feel offered by a discrete unit such as, for example, a TV 325, a Digital Versatile Disc or Compact Disc source 330, a VCR/Laser source 335, or any other external video source 340 currently known or to be developed in the future.

Continuing to refer to FIG. 3, the Video Entertainment Center or Video Control Service 345 is shared by both modes 310 and 320 for operating and/or managing and/or accessing the various discrete units described above. When the system 100 makes a transition from a "no power" state 305, it enters initially state 320. Immediately thereafter, the system 100 progresses to the functionality associated with state 310, mediated by the VEC/VCCS 345. Functionally or experience-wise, therefore, the system 100 is seen to make a transparent transition to state 310 from the "no power" state 305, which transition is shown as a unidirectional "dotted line" 399 in this figure. Further, as can be seen, transition from state 310 to state 320 may be preferably mediated via an access control mechanism 315 operable in conjunction with the VEC/VCCS 345. It should be understood that access control mechanisms may range from simple passwords to various advanced encryption techniques.

In a presently preferred exemplary embodiment, while in state 310 (that is, operating in the non-computer mode), the user may opt to experience any of the following functionalities including, but not limited to: watching TV in full-screen in overscan image, activating and controlling a separate Picture-In-Picture (PIP) window, viewing an external video source (for example, VCR, laser Disc, gameplayer, external Digital Satellite System, external DVD etc.), swapping a PIP image, watching a Motion Picture Experts Group (MPEG) standard video clip, using an Electronic Program Guide, accessing and interacting with Hyper_Text_Markup_Language (HTML) pages and/or accessing additional menued applications. Further, in this mode, the display monitor associated with the system 100 may preferably possess the following characteristics: overscan of the display image, enabled velocity scan modulation, a pre-determined "high" value associated with contrast, brightness and color temperature settings et cetera.

It is contemplated within the realm of the present invention that a preferred exemplary modality relating to state 310 may be a "TV mode" wherein the user obtains an experience that is most nearly identical to that of a conventional TV. In addition to the features described above, the system 100 may preferably be provided with additional features to enhance this modal experience, such as, for example, enabling/disabling closed captioning, channel up/down, direct channel selection, control of display features—brightness, contrast and the like, control of audio, frame freezing, saving frozen frames to files et cetera.

Although not shown in FIG. 3, it should be understood that while in state 320 (that is, computer mode), it is possible for the user to experience a TV program in a PC window ("TV in a window") which preferably appears as a selectable item on a task bar associated with the PC desktop. This "TV in a window" is not the same as the "TV mode" as described hereinabove in relation to state 310. If the user selects the TV application from the task bar, the application will come up in a window which may be dynamically sized and placed on the desktop, just like a normal PC window. However, in a presently preferred exemplary embodiment of the present invention, a PIP would not be permitted in this experience, and display settings and characteristics associated with the non-computer mode would not be available. On the other hand, while engaged in "TV in a window" functionality, the user can switch to the "TV mode" by operating a button on the remote control unit, or by selecting the TV source item on the MENU bar.

As stated above, one of the motivations in the present invention is to provide to the PC/TV system at least two modes of operation, a TV mode and a computer mode. The TV mode is intended to be a mode that performs in a manner that is very similar to watching TV. The computer mode is intended to perform in a fashion that is very similar to using a computer.

An object of the present invention is to keep some of the more complicated, computer related functions and aspects out of the TV mode so that a user is not required to have PC skills to use the TV mode. For example, a user in TV mode should not need to know how to manipulate an active or inactive window nor should the user need to understand about keyboard mouse input focus or pull down menus.

Certain commercial software programs and packages create windows that are programmed to always stay on the "top" and in view of the user. Thus, if these commercial programs are used in computer mode and the PC/TV is switched to TV mode, the user would experience windows from the commercial software on top of the TV viewing area. Thus, a purpose of the present invention is to prevent "top-most" windows in computer software programs from interfering with the TV mode viewing area. At the same time, it is also an object of the present invention to prevent the TV mode operation from altering the behavior of software applications that created top-most windows which in and of themselves are valid and useful when the present invention is operating in computer mode.

Figure 4:
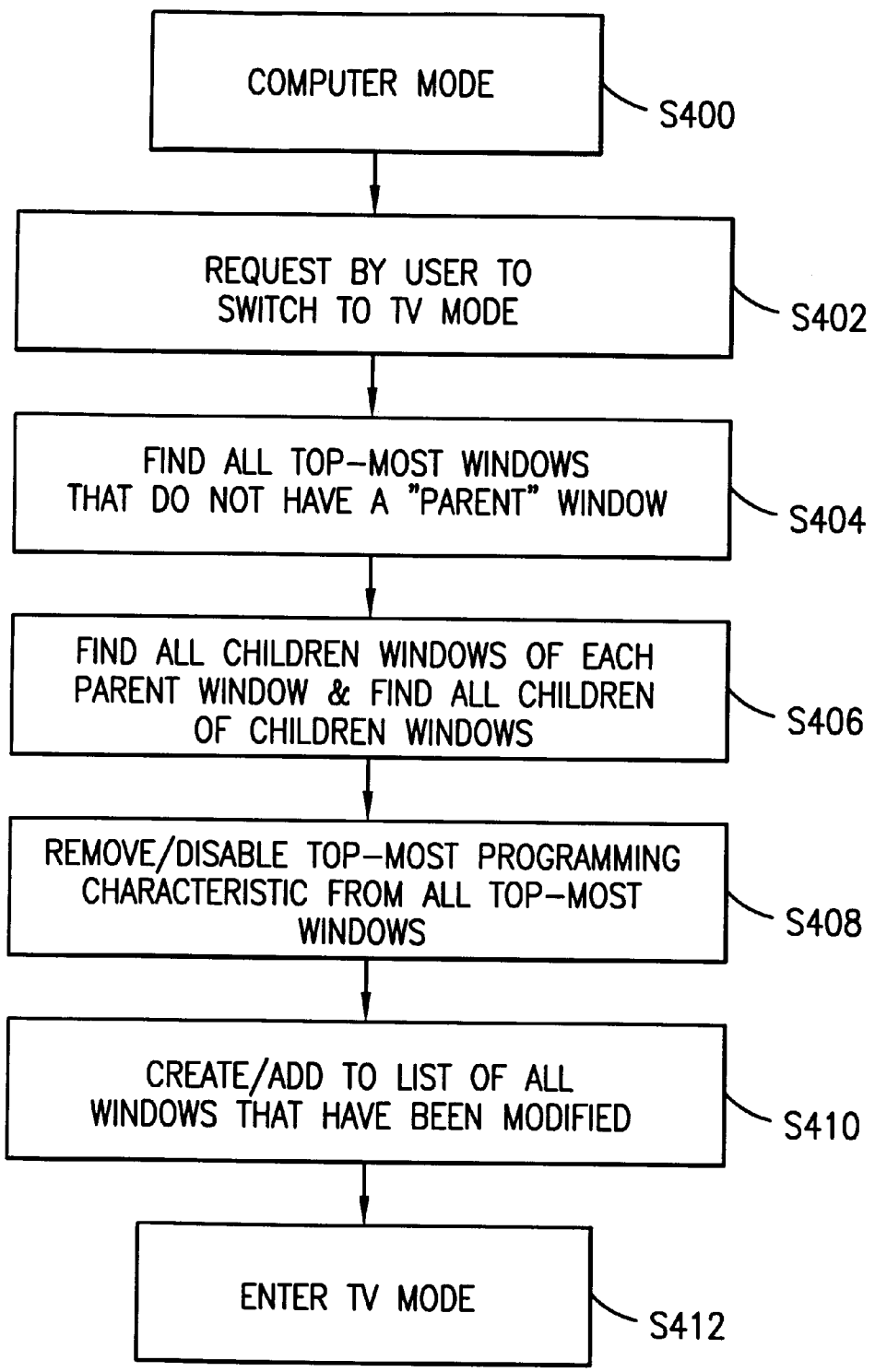
FIG. 4 depicts a flow chart of an exemplary convergence device inhibiting top-most windows when entering TV mode.

Referring now to FIG. 4, when the user is operating the PC/TV convergence system in computer mode and requests that the system switch from computer mode to TV mode, then a recursive set of instructions is performed. The instructions generally reside in the application layer and/or access control areas of the present convergence device. In step S400 the PC/TV is in computer mode. In step S402, the user requests to switch to TV mode. In step S404, the top-most windows that do not have "parent" windows are found. Top-most windows are created as a result of a window application which is directly below a desk-top application. A list is made of all the parentless windows that are active. Then, in step S406 all the windows stemming (e.g., "children" and "grandchildren") from the parent windows are found and added, in an organized manner, to the list made in step S404. Having completed this task, all the windows that are currently active in computer mode are accounted for. In step S408, a top-most programming characteristic is removed from the top-most windows thereby preventing them from being top-most windows. The list is updated to account for each window that had the top-most characteristic modified in S410. This is done in anticipation of the user returning to computer mode. The list can then be reviewed and the top-most characteristic can be restored to the windows which were modified. In step S412, the convergence system enters and/or displays TV mode to the user.

Figure 5:
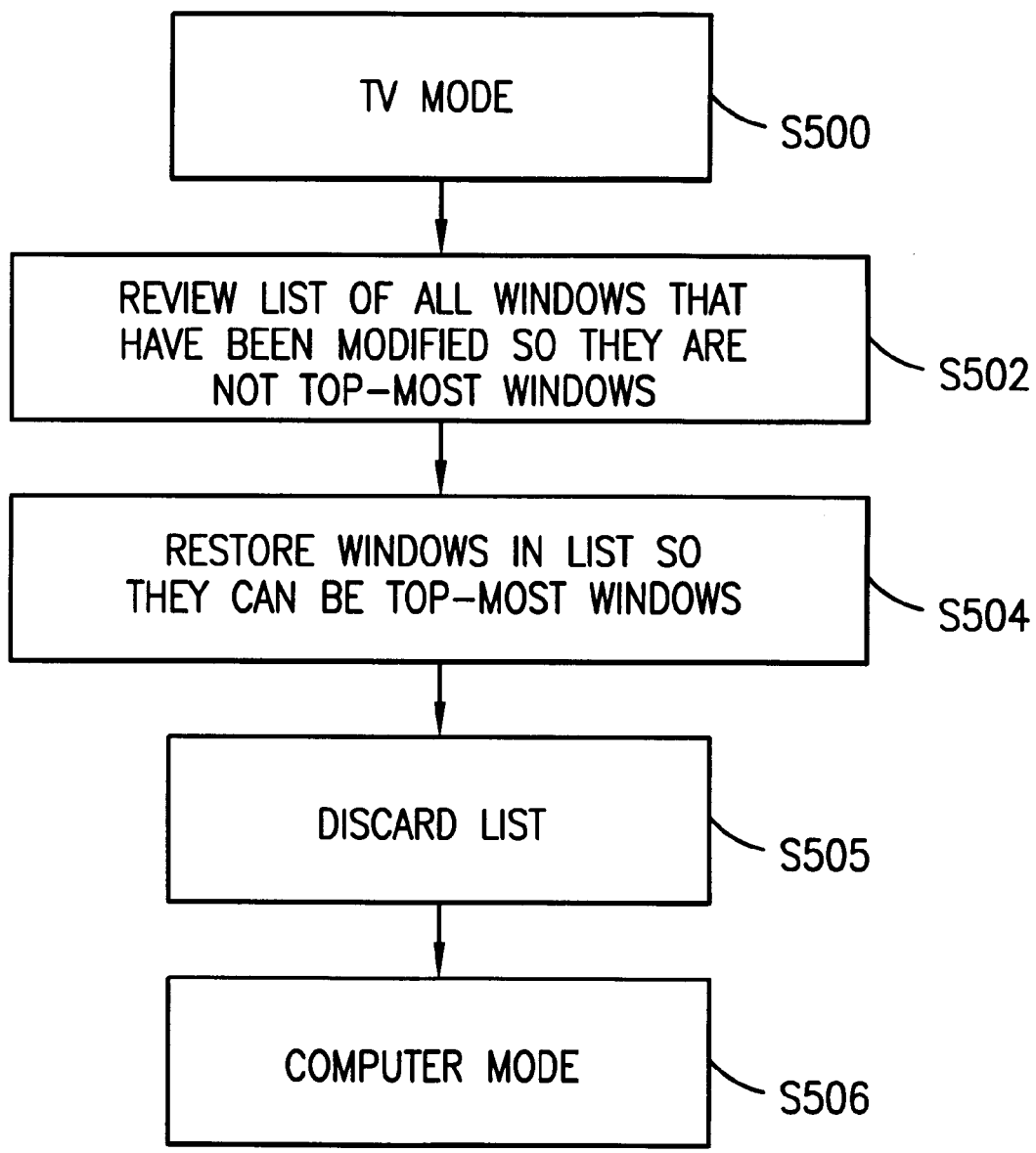
FIG. 5 depicts a flow chart of an exemplary convergence device uninhibiting a top-most window characteristic prior to entering PC mode.

FIG. 5 depicts a flow chart indicating how the present invention switches to TV mode. In step S500 the PC/TV is in TV mode. In step S502 the user has requested to switch to computer mode and the list of all parent and children windows that were active when the PC/TV was in computer mode last is reviewed in step S502. The windows that were modified to remove the "top-most" characteristic are reviewed and if they still exist at the time the PC is switched to PC mode are modified to contain the characteristic allowing them to be top-most windows in step S504. Discard list in step S505. The PC/TV convergence system is now switched to computer mode in step S506.

The operation of removing and replacing the "top-most" characteristic from windows allows the PC/TV to operate in TV mode and still potentially have programs operating in the background, but the windows (top-most windows) will not be displayed while in TV mode. Note in a preferred embodiment, the screen displayed in TV mode is not a top-most screen. This allows greater compatibility with software packages that are designed to overlay video.

When a PC/TV is turned on, the system comes on in TV mode. In actuality, an exemplary embodiment of the present invention may power-up in computer mode and switch to TV mode. In doing so the system checks all the windows that would have been displayed as top-most windows in computer mode at power up. The system places them on a modified top-most windows list, as described above, prior to switching to and displaying TV mode.

The top-most windows list that is located in the present exemplary embodiments can be stored in a volatile memory means, such as RAM, SRAM or flash memory. The top-most list does not have to be stored in a non-volatile memory means such as battery backed RAM or disk drives.

Furthermore, it is understood that the user may have the ability to configure a "launch menu" in an exemplary embodiment. The launch menu allows the user to define and tailor how the PC/TV will respond to certain predetermined circumstances. A user may allow specific windows to be displayed while the PC/TV is in TV mode. For example, a user may want a calendar or alarm program to inform the user of critical events or times, such as a reminder to call someone or respond to a specific e-mail while in TV mode.

In TV mode, the present exemplary embodiment provides a variety of media experiences to the user. Television stations from RF, VHF, UHF, cable providers, satellite providers, telephonic providers, network providers can be displayed in TV mode. Furthermore, video, CD laser movies, DVD media, VCR and other media adapted for presentation on a TV monitor can also be displayed in TV mode. Picture-in-Picture (PIP) can also be implemented in TV mode in a present exemplary embodiment.

Based on the foregoing description, it should be appreciated by those skilled in the art that the convergence device system provided in accordance with the teachings of the present invention overcomes the shortcomings and deficiencies of current technologies by fully converging the functionalities of various discrete units into an integrated device for multiple experiences, each being selectable by the user. The present invention teaches a more versatile system that is selectably optimized for a "menu" of experiences presented to the user. The present invention actively inhibits computer windows from interfering with the system while in TV mode.

Although only certain embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In a PC/TV system capable of switching from a TV mode to a PC mode, a method of restoring top-most windows when said PC/TV system is switched from said TV mode to said PC mode comprising the steps of:

receiving a request to switch from TV mode to PC mode;

reviewing a list of all windows that had a characteristic modified;

restoring all windows which still exist in said list to an unmodified state; and switching to said computer mode.

2. The method of claim 1, further comprising a step of discarding said list after said restoring step.

3. The method of claim 1, wherein said PC/TV system comprises:

a monitor for displaying said PC mode and said TV mode.

4. The method of claim 1, wherein said list is stored in a RAM.

* * * * *